United States Patent
Varghese et al.

(10) Patent No.: US 10,972,350 B2
(45) Date of Patent: Apr. 6, 2021

(54) ASYNCHRONOUS IMAGING OF COMPUTING NODES

(71) Applicant: NUTANIX, INC., San Jose, CA (US)

(72) Inventors: Toms Varghese, Kerala (IN); Jaspal Singh Dhillon, Bengaluru (IN); Raghu Rapole, Telangana (IN); Avi Bhandari, Karnataka (IN)

(73) Assignee: Nutanix, Inc., San Jose, CA (US)

(*) Notice: Subject to any disclaimer, the term of this patent is extended or adjusted under 35 U.S.C. 154(b) by 14 days.

(21) Appl. No.: 15/811,503

(22) Filed: Nov. 13, 2017

(65) Prior Publication Data
US 2019/0149414 A1 May 16, 2019

(51) Int. Cl.
| | |
|---|---|
| *G06F 15/16* | (2006.01) |
| *H04L 12/24* | (2006.01) |
| *G06F 8/61* | (2018.01) |
| *G06F 9/50* | (2006.01) |
| *G06F 9/455* | (2018.01) |
| *G06F 8/60* | (2018.01) |

(52) U.S. Cl.
CPC ............ *H04L 41/0843* (2013.01); *G06F 8/61* (2013.01); *H04L 41/0806* (2013.01); *H04L 41/0886* (2013.01); *G06F 8/60* (2013.01); *G06F 9/45558* (2013.01); *G06F 9/5077* (2013.01); *G06F 2009/45562* (2013.01); *G06F 2009/45579* (2013.01)

(58) Field of Classification Search
CPC ............ H04L 41/0843; H04L 41/0806; H04L 41/0886; G06F 8/60; G06F 9/45558; G06F 9/5077; G06F 2009/45562; G06F 9/4416

USPC ......................................................... 709/220
See application file for complete search history.

(56) References Cited

U.S. PATENT DOCUMENTS

| | | | | |
|---|---|---|---|---|
| 7,774,191 B2* | 8/2010 | Berkowitz | ............ | G06F 9/3004 |
| | | | | 703/23 |
| 8,307,358 B1* | 11/2012 | Koryakina | ................ | G06F 8/61 |
| | | | | 717/138 |
| 8,549,518 B1 | 10/2013 | Aron et al. | | |
| 8,578,340 B1* | 11/2013 | Daudel | ............... | G06F 9/45504 |
| | | | | 710/266 |
| 8,601,473 B1 | 12/2013 | Aron et al. | | |
| 8,776,028 B1* | 7/2014 | Enakiev | ............... | G06F 11/3664 |
| | | | | 714/38.11 |
| 8,850,130 B1 | 9/2014 | Aron et al. | | |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Normin Abedin
(74) *Attorney, Agent, or Firm* — Dorsey & Whitney LLP (57) ABSTRACT

Examples described herein include imaging servers which may support asynchronous imaging of one or more computers (e.g., computing nodes). The imaging server may use out-of-band communication to install requested images on one or more computing nodes. The imaging server may support multiple concurrent installation sessions, and may maintain a log specific to each session. This may facilitate session-specific status reporting. In this manner, operating systems, hypervisors, or other software may be installed on computing nodes.

25 Claims, 4 Drawing Sheets

(56) References Cited

U.S. PATENT DOCUMENTS

| | | | |
|---|---|---|---|
| 8,863,124 B1 | 10/2014 | Aron | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 10,019,252 B1* | 7/2018 | Cui | G06F 8/654 |
| 2006/0218544 A1* | 9/2006 | Chakraborty | G06F 8/63 717/168 |
| 2007/0041386 A1* | 2/2007 | Mar | H04L 67/1095 370/395.52 |
| 2008/0082976 A1* | 4/2008 | Steinwagner | G06F 8/63 718/1 |
| 2009/0328030 A1* | 12/2009 | Fries | G06F 8/63 717/174 |
| 2011/0167472 A1* | 7/2011 | Evans | G06F 9/45541 726/1 |
| 2011/0246981 A1* | 10/2011 | Braun | G06F 9/4416 717/175 |
| 2012/0060220 A1* | 3/2012 | Kerseboom | G06F 21/566 726/24 |
| 2014/0292776 A1* | 10/2014 | Tanaka | G06F 3/038 345/520 |
| 2014/0337843 A1* | 11/2014 | Delamare | H04B 3/542 718/1 |
| 2014/0344704 A1* | 11/2014 | Huang | G06F 1/1632 715/740 |
| 2016/0026451 A1* | 1/2016 | Hanes | G06F 8/61 717/174 |
| 2017/0003951 A1* | 1/2017 | Newell | G06F 8/70 |
| 2017/0339223 A1* | 11/2017 | Lee | G06F 9/45558 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, Ignacio et al. "Curator: Self-Managing Storage for Enterprise Clusters"; University of Washington; published Mar. 2017; pp. all.

* cited by examiner

ASYNCHRONOUS IMAGING OF COMPUTING NODES

TECHNICAL FIELD

Examples described herein including asynchronous imaging of computing nodes. Examples of asynchronous installation of software across multiple computing nodes of one or more distributed systems are described.

BACKGROUND

Installation of software such as one or more operating systems and/or distributed storage software stack(s) can be time-consuming and infrastructure heavy.

For example, administrators and/or developers may create a software package that installs an operating system automatically. A network boot protocol, a preboot execution environment (PXE), may be used to deliver this software package to the computers to be imaged.

Imaging processes using PXE requires a DHCP server, a PXE server, a TFTP server, and all the PXE boot configuration files, which are onerous to set up and maintain. The systems to be imaged must reside in the same broadcast domain as these servers, which a corporate network often makes impractical.

DETAILED DESCRIPTION

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples described herein include imaging servers which may support asynchronous imaging of one or more computers (e.g., computing nodes). The imaging server may use out-of-band communication to install requested images on one or more computing nodes. The imaging server may support multiple concurrent installation sessions, and may maintain a log specific to each session. This may facilitate session-specific status reporting.

Figure 1:
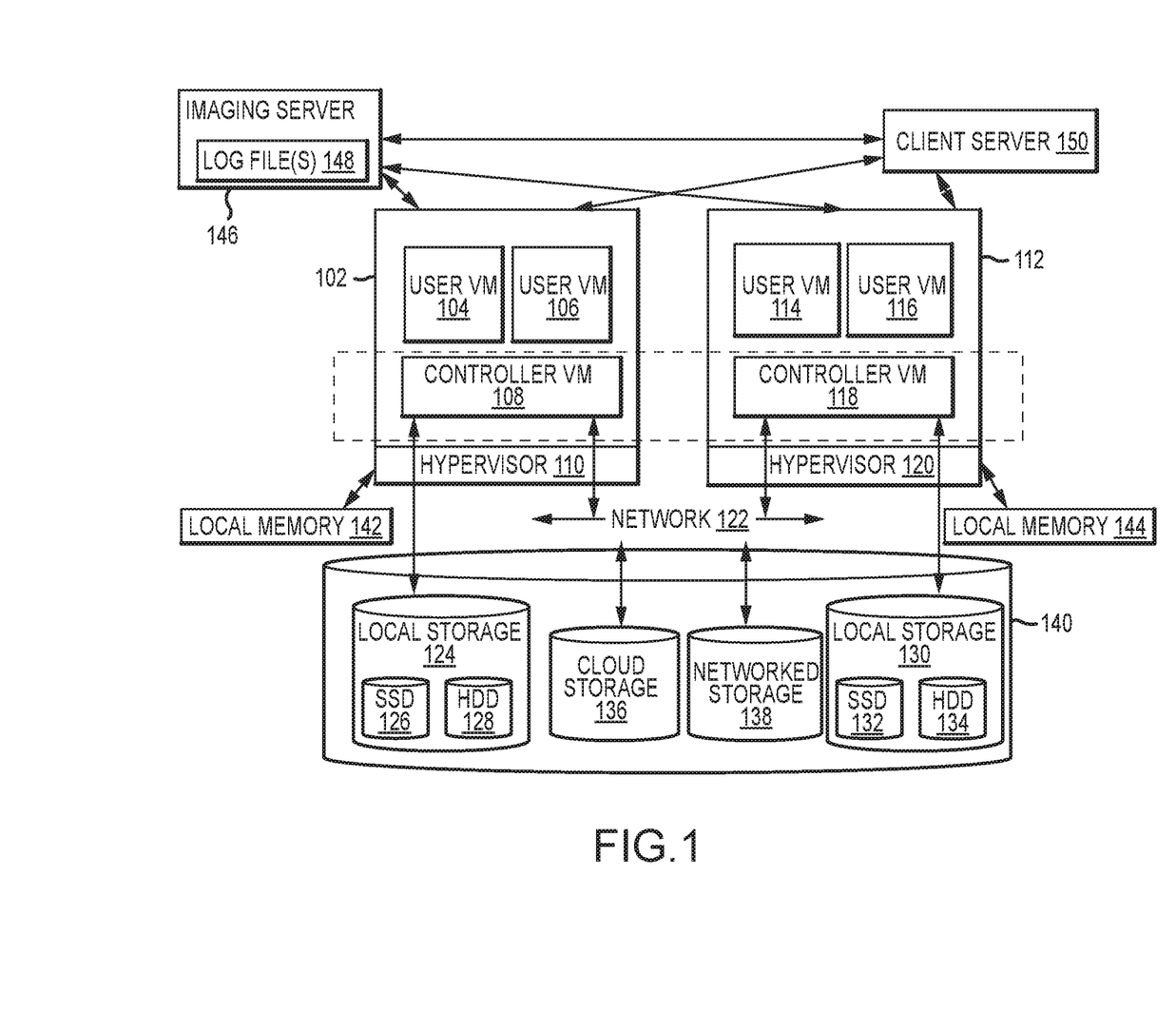
FIG. 1 is a schematic illustration of a distributed computing system, arranged in accordance with examples described herein.

FIG. 1 is a block diagram of a distributed computing system, in accordance with an embodiment of the present invention. The distributed computing system of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128). Similarly, local storage 130 may include SSD 132 and HDD 134. Local storage 124 and local storage 130 may be directly coupled to, included in, and/or accessible by a respective computing node 102 and/or computing node 112 without communicating via the network 122. Cloud storage 136 may include one or more storage servers that may be stored remotely to the computing node 102 and/or computing node 112 and accessed via the network 122. The cloud storage 136 may generally include any type of storage device, such as HDDs SSDs, or optical drives. Networked storage 138 may include one or more storage devices coupled to and accessed via the network 122. The networked storage 138 may generally include any type of storage device, such as HDDs SSDs, or optical drives. In various embodiments, the networked storage 138 may be a storage area network (SAN).

The computing node 102 is a computing device for hosting VMs in the distributed computing system of FIG. 1. The computing node 102 may be, for example, a server computer, a laptop computer, a desktop computer, a tablet computer, a smart phone, or any other type of computing device. The computing node 102 may include one or more physical computing components, such as processors.

The computing node 102 is configured to execute a hypervisor 110, a controller VM 108 and one or more user VMs, such as user VMs 104, 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any number may be implemented.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 108 and/or controller VM 118, may provide services for the user VMs in the computing node. As an example of functionality that a controller VM may provide, the controller VM 108 may provide virtualization of the storage 140. Controller VMs may provide management of the distributed computing system shown in FIG. 1. Examples of controller VMs may execute a variety of software and/or may serve the I/O operations for the hypervisor and VMs running on that node. In some examples, a SCSI controller, which may manage SSD and/or HDD devices described herein, may be directly passed to the CVM, e.g., leveraging VM-Direct Path. In the case of Hyper-V, the storage devices may be passed through to the CVM.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i).

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local memory 142. Services running on controller VM 118 may utilize memory in local memory 144. The local memory 142 and local memory 144 may be shared by VMs on computing node 102 and computing node 112, respectively, and the use of local memory 142 and/or local memory 144 may be controlled by hypervisor 110 and hypervisor 120, respectively. Moreover, multiple instances of the same service may be running throughout the distributed system—e.g. a same services stack may be operating on each controller VM. For example, an instance of a service may be running on controller VM 108 and a second instance of the service may be running on controller VM 118.

Examples described herein may include an imaging server, such as imaging server 146. The imaging server 146 may be separate from computing node 102 and/or computing node 112. The imaging server 146 may be completely separate, although in some examples, the imaging server 146 may share hardware with one or more of the computing node 102 and/or computing node 112. The imaging server 146 may communicate with computing node 102 and/or computing node 112 over a network, such as network 122 or another network (e.g., a WAN, LAN, and/or Internet). As described herein, the imaging server 146 may support asynchronous imaging of computers in one or more distributed systems, including computing node 102 and/or computing node 112. The imaging server 146 may maintain one or more log file(s) 148 specific to each imaging session so that the status of each imaging session may be independently queried in some examples. The imaging server 146 may provide software installation package(s) to computers (e.g., computing nodes) to be imaged, which may include software package(s) for installation of one or more operating systems, distributed storage service stack(s), and/or hypervisor(s). For example, the imaging server 146 may provide a software installation package to install an operating system, controller VM 108, and/or hypervisor 110 on computing node 102. The imaging server 146 may communicate with other computers to be imaged utilizing out-of-band communications, which may avoid a need to utilize PXE.

The imaging server 146 may support asynchronous imaging. For example, the imaging server 146 may manage multiple installations of computers and/or clusters in parallel. The status of the various parallel installations may be maintained in log file(s) 148. During operation, the imaging server 146 may receive an imaging request to image at least one computing node (e.g., computing node 102). The imaging server 146 may initiate imaging of the node responsive to the request, and may initiate a log of progress responsive to the request. For example, the request may be associated with a particular session ID, and the log file(s) 148 may include a record of the session ID associated with the status of the responsive imaging. While the first imaging request is being serviced (e.g., while the computing node 102 is being imaged), the imaging server 146 may receive another imaging request (e.g., to image computing node 112 and/or another computing node, computer, and/or cluster). The imaging server 146 may initiate the imaging responsive to the second request, and may generate a log file responsive to the second request. For example, the log file(s) 148 may include a session ID particular to the second request associated with a status of the responsive imaging.

One or more client servers may be utilized in examples described herein, such as client server 150. The client server 150 may be separate from computing node 102, computing node 112, and/or imaging server 146. However, in some examples, the client server 150 may share hardware with one or more of the computing node 102, computing node 112, and/or imaging server 146. The client server 150 may communicate with the imaging server 146, computing node 102, and/or computing node 112 over a network, such as network 122 or another network (e.g., a WAN, LAN, and/or Internet). As described herein, the client server 150 may request imaging of one or more computers and/or one or more clusters from imaging server 146. The client server 150 may query imaging server 146 for status of any particular imaging session. While a single client server 150 is shown in FIG. 1, any number may be present in examples described herein. A single imaging server 146 may service installation requests from multiple client servers in some examples.

In some examples, the client server 150 may include automated assessment tools for preparing an enterprise for imaging of computers. The client server 150 may execute the automated assessment tool(s) to collect configuration information from one or more computers in a computing environment (e.g., cluster, enterprise, or other grouping) accessible to the client server 150. For example, the client server 150 may query computers and/or computing nodes and store a list of names and/or other configuration information for the computers and/or computing nodes. Examples of configuration information include current and/or desired operating system type, brand, and/or version, current and/or desired software stack(s), user IDs, permissions, or combinations thereof. The client server 150 may provide the configuration information to the imaging server 146. The imaging server 146 may proceed to image the computers and/or computing nodes in accordance with the configuration information. In this manner, a client may perform automated imaging of computers (e.g., within an enterprise).

In some examples, one or more of the computing nodes (e.g., computing node 102 and/or computing node 112) may include one or more baseboard management controllers (BMCs). In some examples, the imaging server 146 may utilize out-of-band communications to communicate with a BMC of one or more computing nodes.

Figure 2:
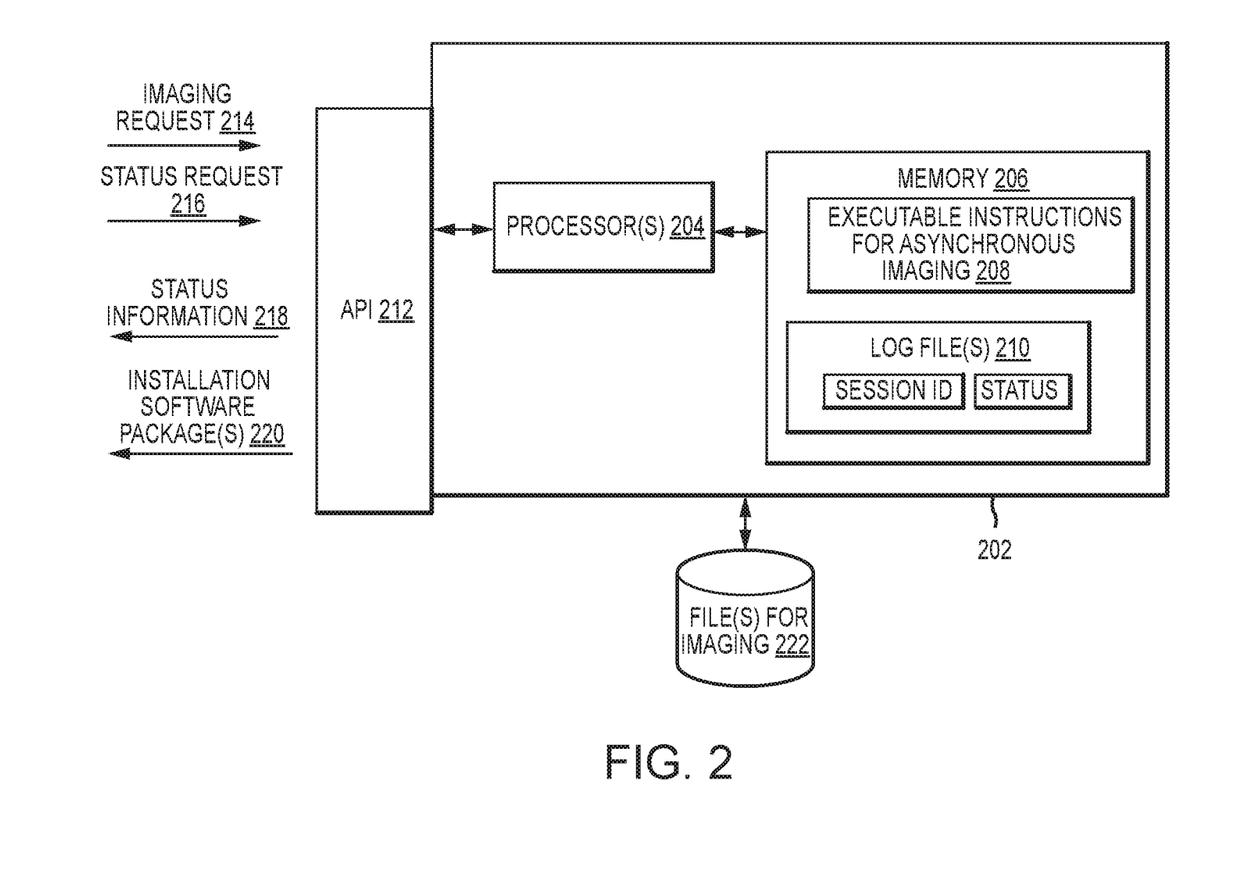
FIG. 2 is a schematic illustration of an imaging server arranged in accordance with examples described herein.

FIG. 2 is a schematic illustration of an imaging server arranged in accordance with examples described herein. The imaging server 202 includes processor(s) 204 and memory 206. The memory 206 may include executable instructions for asynchronous imaging 208 and/or log file(s) 210. The imaging server 202 may include and/or may have access to file(s) for imaging 222. The imaging server 202 may expose API 212. The API 212 may be used to communicate with one or more other systems. The imaging server 202 may receive an imaging request 214 and may provide one or more installation software package(s) 220 responsive to the imaging request 214. The installation software package(s) 220 may be provided to the client who initiated the imaging request 214 and/or to the computing node(s) themselves. The imaging server 202 may receive a status request 216 and may provide status information 218 responsive to the status request 216. The imaging server 202 may be used to implement and/or may be implemented using imaging server 146 of FIG. 1.

Imaging servers described herein, such as imaging server 202 and/or imaging server 146 of FIG. 1, may be implemented using one or more physical and/or virtual machines and/or containers (e.g., dockers). The imaging server may be running (e.g., hosting and/or executing), a webserver, such as a python webserver in some examples. The webserver may facilitate the exposure of one or more APIs by the imaging server (e.g. API 212).

Imaging servers described herein, such as imaging server 202, may include one or more processor(s) (e.g., processor(s) 204) and memory (e.g., memory 206). The processor(s) 204 may be implemented using, for example, one or more central processing units (CPUs), which may include for example one or more multi-core processors in some examples. In some examples, the processor(s) 204 may be implemented wholly or partially using custom circuitry—e.g., controllers, application specific integrated circuits (ASICs), field programmable gate arrays (FPGAs), or combinations thereof. The memory 206 may generally be implemented using any electronically accessible storage. For example, random access memory (RAM), read only memory (ROM), flash, solid state drive (SSD), or combinations thereof may be used.

The memory 206 may include executable instructions for asynchronous imaging 208 (e.g., the imaging server 202 may be programmed to perform asynchronous imaging). The executable instructions for asynchronous imaging 208 may include instructions which, when executed, cause the imaging server 202 to perform the actions for asynchronous imaging described herein. For example, the memory 206 may be coupled to the processor(s) 204. The processor(s) 204 may execute the executable instructions for asynchronous imaging 208 to perform actions described herein.

The memory 206 may include log file(s) 210. While shown as stored in memory 206, the same memory as storing executable instructions for asynchronous imaging 208, in some examples, the log file(s) 210 and executable instructions for asynchronous imaging 208 may be located on different memory devices and/or in different storage locations. Furthermore, the log file(s) 210 and/or executable instructions for asynchronous imaging 208 may either or both be distributed across multiple memories and/or storage devices.

File(s) for imaging 222 may be provided in storage accessible to imaging server 202. The storage may be implemented, for example, using one or more solid state drives (SSDs), hard disk drives (HDDs), or memory (e.g., RAM, ROM, flash). In some examples, one or more file(s) for imaging may additionally or instead be stored in memory 206. The file(s) for imaging 222 may include, for example, installers, software images, or combinations thereof.

Imaging servers described herein may expose an application programming interface (API), such as API 212. The API 212 may be exposed, for example, in accordance with executable instructions for asynchronous imaging 208 and/or other executable instructions, which may include executable instructions for hosting a webserver. The API 212 may provide an interface for requesting imaging, starting installation, requesting status of imaging sessions, tracking progress (e.g., status) of imaging sessions, or combinations thereof. The API 212 may provide additional and/or different functionality in other examples.

During operation, the imaging server 202 may receive imaging requests. For example, the imaging server 202 may receive imaging request 214. The imaging request may be received, for example, from a client server described herein (e.g., client server 150 of FIG. 1). The client server may, for example, provide the imaging request through a user interface (e.g., a graphical user interface) which may be hosted by a webserver of the imaging server, such as the imaging server 146 and/or imaging server 202. The imaging request may include a request to install software on one or more computers (e.g., a cluster, one or more computing nodes). For example, the imaging request may include a request to start a new cluster, add computing nodes to an existing cluster, and/or provision nodes. The software requested may be one or more operating systems and/or one or more distributed storage services stack(s). For example, referring back to FIG. 1, the imaging request 214 may request an operating system (e.g., Windows or Linux) be installed on computing node 102 and may request that controller VM 108 be installed on computing node 102. In some examples, the imaging request 214 may include one or more file(s) for performing the requested installation, including one or more installers. The files may be stored by the imaging server 202 in the file(s) for imaging 222.

Responsive to the imaging request 214, the imaging server 202 may (e.g., in accordance with executable instructions for asynchronous imaging 208), initiate installation of the requested software on the requested computers. To initiate installation, the imaging server 202 may access the file(s) for imaging 222 and may assemble installation software packages to perform the requested installation. The installation software package(s) 220 may then be provided to the requesting device (e.g., client server 150 of FIG. 1) and/or to the computer to which it pertains (e.g., computing node 102 of FIG. 1). The imaging request 214 may be received through the API 212.

The imaging request 214 may include configuration information for the requested installation. The imaging server 202 may accordingly provide installation software package(s) 220 in accordance with the configuration information. As described herein, configuration information may include computer (and/or computing node) name, currently-installed operating system brand, type, and/or version, desired operating system brand type, and/or version, currently-installed distributed storage services stack brand, type, and/or version, desired distributed storage services stack brand, type, and/or version, currently-installed hypervisor brand, type, and/or version, desired hypervisor brand, type, and/or version, or combinations thereof. In some examples, configuration information may include node-specific provisioning information. For example, settings or other information which should be applied to a specific node (e.g., a specific computer) or groups of nodes may be provided.

Responsive to the imaging request 214 also, the imaging server 202 may (e.g., in accordance with executable instructions for asynchronous imaging 208), create a unique imaging session. The imaging session may include a record of the request and a string uniquely identifying the request (e.g., a session ID). In some examples, the sessions are further protected with one or more keys. The imaging server 202 may initiate a log of progress responsive to the imaging request 214. For example, the imaging server 202 may assign the session ID to one or more installations associated with the imaging request 214. The session ID may be stored in log file(s) 210 associated with a status of the installation. The session ID may be provided to the requestor (e.g., the system that provided imaging request 214, such as client server 150 of FIG. 1 in some examples). Similarly, a key needed for access to the session ID may be provided to the requestor. Examples of installation status include 'in progress', completed, failed, pending (e.g., not yet started). The imaging server 202 may stay in communication with the computers undergoing installation during installation in order to maintain (e.g., update) the log file(s) 210. In some examples, the imaging server 202 may send messages and/or alerts based on information in the log file(s) 210. For example, when status information associated with a particular session ID in the log file(s) 210 indicates the installation has failed, the imaging server 202 may send a failure alert to the entity that requested the installation associated with the session ID (e.g., client server 150 of FIG. 1 for example).

The log file(s) 210 may allow the imaging server 202 to provide the status of any particular installation. For example, the imaging server 202 may receive status request 216. The status request 216 may be provided, for example, by client server 150 of FIG. 1. The status request 216 may relate back to a specified installation request, e.g., imaging request 214, and may identify that installation request (e.g., utilizing an identifier for the installation request and/or the session ID assigned by the imaging server 202). The imaging server 202 may respond to the status request 216 with status information 218 based on the status stored in the log file(s) 210. Note that the imaging server 202 may accordingly provide only the status associated with the status request 216 (e.g., with the particular session ID provided), and may not provide information regarding other concurrent installations.

As described herein, the imaging server 202 may support asynchronous imaging sessions. Accordingly, during a time that the imaging server 202 is servicing imaging request 214 (e.g., during installations occurring responsive to imaging request 214), the imaging server 202 may receive another request for imaging of additional and/or different computers. The subsequent request may also be received through API 212. The imaging server 202 may similarly, responsive to the second request, develop responsive installation software package(s), assign a session ID, and initiate a log (e.g., store a log file) associating the session ID with a status of the installation.

Generally, any number of concurrent installations may be supported by imaging servers and methods described herein, including up to 2, 3, 4, 5, 6, 7, 8, 9, 10, 20, 30, 40, 50, 60, 70, 80, 90, 100, or another number of installations.

The imaging server 202 may identify file resources and/or installation steps which may be shared between concurrent installation request, and may reuse those resources to service multiple request. For example, the imaging server 202 may analyze the file(s) for imaging 222 to identify files which may be responsive to both the imaging request 214 and a subsequent imaging request. For example, a Windows installer file may be used to service two different requests for imaging when a Windows installation is part of the request. The imaging server 202 may utilize the same file in file(s) for imaging 222 to service both requests. This may avoid the need to receive and/or store duplicative files used in multiple installations. For example, the imaging server 202 may notify a requestor that a file responsive to an imaging request is currently accessible to imaging server 202. The requestor may accordingly not provide another copy of the already-available file.

Note that communications with the imaging server 202, such as imaging request 214, status request 216, status information 218, and/or installation software package(s) 220 may occur using out-of-band communications (e.g., using an out-of-band communication channel). For example, an IP connection may be formed between the imaging server 202 and the requestor (e.g., client server 150 of FIG. 1). For example, the imaging server 202 may communicate with the computers to be imaged (e.g., the computing node(s) 102, 112 of FIG. 1) using out-of-band communications to one or more BMCs. Similarly, an IP connection may be formed between the imaging server 202 and the computers to be imaged. Accordingly, the computers on which installations are requested, and the requesting servers themselves, need not be in the same broadcast domain as the imaging server 202. Out-of-band communications may refer, for example, to the use of an intelligent platform management interface (IPMI) between the imaging server and the computers being imaged. The imaging server 202 may implement IPMI communications with the computers being imaged to allow for communication with the computers prior to operating system installation. In some examples, the out-of-band communication may occur using a baseboard management controller (BMC) in the imaging server and/or computers to be imaged (e.g., computing node 102 and/or computing node 112 of FIG. 1).

Figure 3:
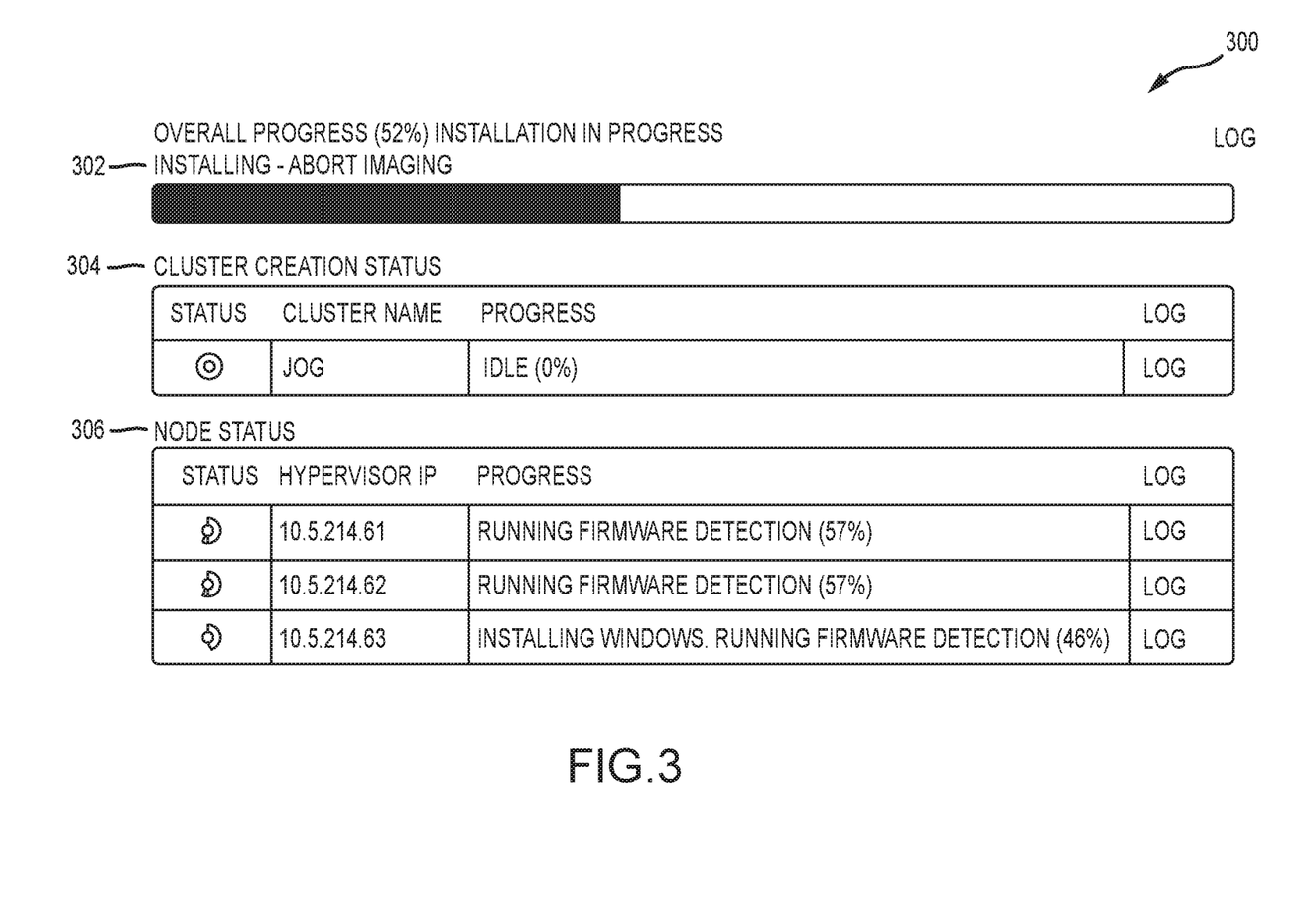
FIG. 3 is a schematic illustration of a user interface arranged in accordance with examples described herein.

FIG. 3 is a schematic illustration of a user interface arranged in accordance with examples described herein. The user interface 300 may include overall progress bar 302, cluster status report 304, and node status report 306. Additional, fewer, and/or different displayed information may be used in other examples.

The user interface 300 may be displayed by a client server described herein, such as client server 150 of FIG. 1. The user interface 300 may accordingly be used by an administrator to monitor installations as described herein. In some examples, the user interface 300 may be displayed by an imaging server described herein, such as imaging server 146 of FIG. 1 and/or imaging server 202 of FIG. 2. The user interface 300 may be used by an administrator to monitor installations being serviced by the imaging server in some examples.

The user interface 300 may, in some examples, be a user interface hosted by a web service running on an imaging server described herein. For example, a same web service which facilitates exposure of API 212 in FIG. 2 may host user interface 300, and cause user interface 300 to be displayed on a client server and/or imaging server described herein.

The user interface 300 as shown is displaying the status of a requested installation of a cluster named "jog" which includes three nodes having IP addresses 10.5.214.61, 10.5.214.62, and 10.5.214.63, respectively. The status information shown in FIG. 3 may be obtained by accessing log files stored by the imaging server for the nodes shown—for example, the user interface 300 may display information obtained from log file(s) 210 of FIG. 2 and/or log file(s) 148 of FIG. 1.

The overall progress bar 302 provides a view of the percentage complete of the overall cluster. At the time shown in FIG. 3, the cluster installation was 52% complete. A button or link may be provided to abort the installation.

The cluster status report 304 provides a view of the status by cluster. The cluster status report 304 in FIG. 3 provides a status column showing a "ring" providing a visual indication of percentage completion. The cluster status report 304 provides a column for cluster name ("jog" in FIG. 3). The cluster status report 304 provides a column for progress, where the status of the installation may be reported. The progress shown in FIG. 3 is "Idle" (e.g., not yet initiated), and the percent status is numerically reported in the column as 0%. The cluster status report 304 also provides a column with a link to a log for the cluster. For example, a link to the installation log file in log file(s) 210 may be provided.

The node status report 306 provides a view of the status by node. The node status report 306 in FIG. 3 provides a status column showing a "ring" providing a visual indication of percentage completion for each node. The node status report 306 provides a column for hypervisor IP (10.5.214.61-63 in FIG. 3). The node status report 306 provides a column for progress, where the status of the installation may be reported. The progress shown in FIG. 3 is, respectively "Running firmware detection" (e.g., in progress) for two of the nodes, and "Installing Windows. Running firmware detection" (e.g., in progress) for one of the nodes. The percent status is numerically reported in the column, shown in the time of FIG. 3 as 57%, 57%, and 46%, respectively. The node status report 306 also provides a column with a link to a log for the node. For example, a link to the installation log file in log file(s) 210 may be provided.

Figure 4:
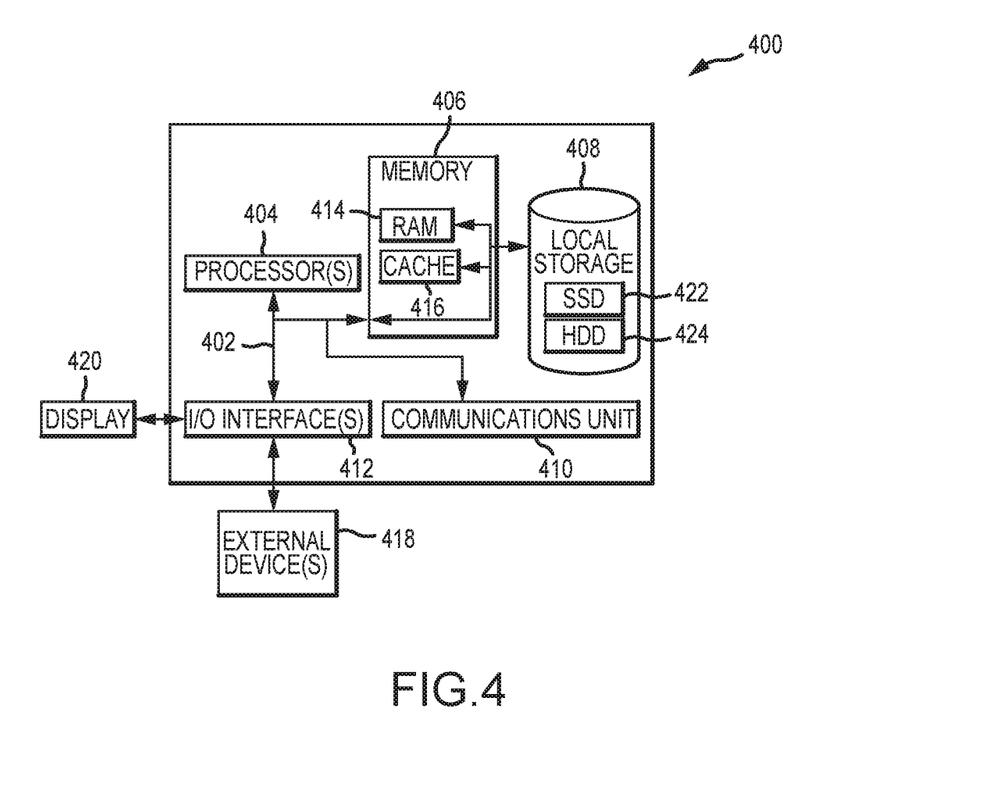
FIG. 4 depicts a block diagram of components of a computing node in accordance with examples described herein.

FIG. 4 depicts a block diagram of components of a computing node 400 in accordance with examples described herein. It should be appreciated that FIG. 4 provides only an illustration of one implementation and does not imply any limitations with regard to the environments in which different embodiments may be implemented. Many modifications to the depicted environment may be made. The computing node 400 may implemented as the computing node 102 and/or in some examples. Similarly the components of computing node 400 may be used to implement an imaging server and/or client server described herein.

The computing node 400 includes a communications fabric 402, which provides communications between one or more processor(s) 404, memory 406, local storage 408, communications unit 410, I/O interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses.

The memory 406 and the local storage 408 are computer-readable storage media. In this embodiment, the memory 406 includes random access memory RAM 414 and cache 416. In general, the memory 406 can include any suitable volatile or non-volatile computer-readable storage media. The local storage 408 may be implemented as described above with respect to local storage 124 and/or local storage 130. In this embodiment, the local storage 408 includes an SSD 422 and an HDD 424, which may be implemented as described above with respect to SSD 126, SSD 132 and HDD 128, HDD 134 respectively. In some examples, local storage 408 includes a magnetic HDD 424. Alternatively, or in addition to a magnetic hard disk drive, local storage 408 can include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

Various computer instructions, programs, files, images, etc. may be stored in local storage 408 for execution by one or more of the respective processor(s) 404 via one or more memories of memory 406. For example, when used to implement an imaging server, the memory 406 may include the executable instructions for asynchronous imaging 208 and/or log file(s) 210 of FIG. 2, and the memory 406 and/or local storage 408 may include the file(s) for imaging 222 of FIG. 2.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computing node 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention can be stored on such portable computer-readable storage media and can be loaded onto local storage 408 via I/O interface(s) 412. I/O interface(s) 412 may also connect to a display 420.

Display 420 provides a mechanism to display data to a user and may be, for example, a computer monitor. When the computing node 400 is used to implement a client server and/or imaging server described herein, the display 420 may display, for example, the user interface 300 of FIG. 3.

From the foregoing it will be appreciated that, although specific embodiments have been described herein for purposes of illustration, various modifications may be made while remaining with the scope of the claimed technology.

Examples described herein may refer to various components as "coupled" or communications as being "provided to" or "received from" certain components. It is to be understood that in some examples the components are directly coupled one to another, while in other examples the components are coupled with intervening components disposed between them. Similarly, communications may be provided directly to and/or received directly from the recited components without intervening components, but also may be provided to and/or received from the certain components through intervening components.

What is claimed is:

1. A non-transitory computer readable medium encoded with executable instructions which, when executed by the processor, causes a server to perform a method comprising:
expose an API for imaging requests;
responsive to a first imaging request, received through the API, to provision at least one computing node including to install a first operating system, a first distributed storage services stack, or both on the at least one computing node, initiating installation of the first operating system, the first distributed storage stack, or both by initiating imaging of the at least one computing node and initiating a first log of progress;
responsive to a second imaging request, received through the API, to provision at least one other computing node including to install a second operating system, a second distributed storage services stack, or both on the at least one other computing node during at least a portion of time that the at least one computing node is being provisioned, initiating installation of the second operating system, the second distributed services stack, or both by imaging of the at least one other computing node and initiating a second log of progress.

2. The non-transitory computer readable medium of claim 1, wherein the executable instructions further cause the server to receive the first imaging request over an out of band communication connection.

3. The non-transitory computer readable medium of claim 1, wherein the executable instructions further cause the server to expose an application programming interface for imaging, and wherein the first imaging request and the second imaging request are received over the API.

4. The non-transitory computer readable medium of claim 1, wherein said executable instructions cause the server to perform said initiate imaging of the at least one computing node based on configuration information specific to the at least one computing node, the configuration information included in the first imaging request.

5. The non-transitory computer readable medium of claim 1, wherein the executable instructions further cause the server to receive a request for status of the progress responsive to the first imaging request.

6. The non-transitory computer readable medium of claim 5, wherein the executable instructions further cause the server to provide status based on the first log.

7. The non-transitory computer readable medium of claim 6, wherein the status comprises an indication of whether the imaging of the at least one computing node is in progress, failed, or complete.

8. The non-transitory computer readable medium of claim 1, wherein the executable instructions cause the server to provision a plurality of computing nodes responsive to the first imaging request.

9. The non-transitory computer readable medium of claim 1, wherein the executable instructions further cause the server to identify at least one file accessible to the server which are responsive to both the first imaging request and the second imaging request.

10. The non-transitory computer readable medium of claim 9, wherein the executable instructions further cause the server to utilize the at least one file for both the first imaging request and the second imaging request.

11. The non-transitory computer readable medium of claim 1, wherein said executable instructions further cause the server to install the first operating system, and to install the second operating system.

12. The non-transitory computer readable medium of claim 11, wherein the first operating system is different than the second operating system.

13. A method comprising:
exposing an application programming interface (API) for asynchronous imaging sessions;
receiving a first request for imaging at least one computing node through the application programming interface;
assigning a session identification to the first request, and initiating imaging of the at least one computing node responsive to the first request, including installing a first operating system, a first distributed storage services stack, or both on the at least one computing node;
during at least a portion of time the imaging of the at least one computing node is occurring, receiving a second request for imaging at least another computing node through the application programming interface, including installing a second operating system, a second distributed storage services stack, or both on the at least another computing node; and
assigning another session identification to the second request, and initiating installation of the second operating system, the second distributed storage services stack, or both by initiating imaging of the at least another computing node responsive to the second request.

14. The method of claim 13, wherein the first request is received over an out of band communication channel.

15. The method of claim 13, further comprising:
receiving a request for status of the imaging responsive to the first request; and
returning a status of the imaging responsive to the first request.

16. The method of claim 15, wherein said returning a status comprises accessing a log associated with the session identification.

17. The method of claim 15, wherein said returning a status comprises returning whether the imaging responsive to the first request is in progress, completed, or failed.

18. The method of claim 13, wherein the method comprises installing the first operating system and installing the second operating system.

19. The method of claim 18, wherein the first operating system is different than the second operating system.

20. A method comprising:
conducting an automated assessment of a computing environment to provide configuration information regarding a plurality of computing nodes in the computing environment;
providing the configuration information to an application programming interface of an imaging server for asynchronous imaging of the plurality of computing nodes;
receiving an initiation of imaging at each of the plurality of computing nodes from the imaging server in accordance with the configuration information,
wherein the imaging server initiates imaging of a first computing node, including installing a first operating system, a first distributed storage services stack, or both on the first computing node, and during at least a portion of time that the first computing node is being provisioned, initiating imaging of a second computing node, including installing a second operating system, a second distributed storage services stack, or both on the second computing node.

21. The method of claim 20, further comprising, requesting status of imaging at least one of the plurality of computing nodes through the application programming interface.

22. The method of claim 21, receiving the status based on access of a log specific to the imaging of the at least one of the plurality of computing nodes.

23. The method of claim 20, wherein conducting the automated assessment comprises executing software which collects current software versions running on the plurality of computing nodes.

24. The method of claim 20, wherein the method comprises installing the first operating system and installing the second operating system.

25. The method of claim 24, wherein the first operating system is different than the second operating system.

* * * * *